United States Patent [19]

Erickson

[11] Patent Number: 5,363,612
[45] Date of Patent: Nov. 15, 1994

[54] DISPLAY PANEL ASSEMBLY

[76] Inventor: Arvid L. Erickson, 21365 Hamburg Ave., Lakeville, Minn. 55044

[21] Appl. No.: 17,009

[22] Filed: Feb. 12, 1993

[51] Int. Cl.⁵ .............................................. E04C 2/38
[52] U.S. Cl. ................... 52/239; 52/238.1; 52/586.1; 52/36.4; 403/403
[58] Field of Search ............... 52/243.1, 238.1, 239, 52/281.1, 582, 584, 588, 823, 489, 71, 36.4, 36.5, 36.6, 586.1, 586.2; 160/351, 135; 403/403, 406.1, 205

[56] References Cited

U.S. PATENT DOCUMENTS

| | | |
|---|---|---|
| 1,888,523 | 11/1932 | Williamson . |
| 3,101,817 | 8/1963 | Radek . |
| 3,174,592 | 3/1965 | Berman et al. . |
| 3,323,819 | 6/1967 | Barker . |
| 3,700,385 | 10/1972 | Sherwood ............................ 52/585 |
| 3,861,101 | 1/1975 | Whisson ............................ 52/238.1 |
| 4,012,090 | 3/1977 | Pfeifer et al. ....................... 52/586 |
| 4,185,430 | 1/1980 | Gartung ............................... 52/239 |
| 4,338,578 | 3/1984 | Logan .................................. 40/152 |
| 4,535,577 | 8/1985 | Tenser et al. ..................... 52/238.1 |
| 4,567,698 | 2/1986 | Morrison ............................. 52/239 |
| 4,625,483 | 12/1986 | Zackey et al. ...................... 52/284 |
| 4,716,699 | 1/1988 | Crossman et al. .................. 52/239 |
| 4,944,416 | 7/1990 | Petersen et al. .................... 52/36.5 |
| 5,142,832 | 9/1992 | Branham, Sr. et al. ............. 52/36.4 |
| 5,187,912 | 2/1993 | Hsueh ............................... 52/238.1 |
| 5,219,406 | 6/1993 | Raz ..................................... 52/239 |

FOREIGN PATENT DOCUMENTS

| | | | |
|---|---|---|---|
| 1028791 | 5/1953 | France ............................. 52/282.2 |
| 2060022 | 4/1981 | United Kingdom ................ 52/239 |

Primary Examiner—Carl D. Friedman
Assistant Examiner—Winnie Yip
Attorney, Agent, or Firm—Burd, Bartz & Gutenkauf

[57] ABSTRACT

A fixture having a plurality of upright panels joined together with connectors extending into grooves on adjacent ends of the panels. End caps have inwardly directed lips that extend into longitudinally aligned vertical grooves on the ends of the panels to hold the caps on the panels ends and form the end grooves. The connectors have downwardly directed legs located in the end grooves to join the adjacent panels together at either a 45 degree relationship or a 90 degree relationship or a 180 degree relationship relative to each other. The outer faces of the panels are interrupted with at least one horizontal groove for accommodating merchandise support hangers.

18 Claims, 2 Drawing Sheets

1

DISPLAY PANEL ASSEMBLY

FIELD OF THE INVENTION

The invention relates to display panel structures having structural joints for connecting adjacent panels together.

BACKGROUND OF THE INVENTION

Several panel support structures and connectors have been used to assemble shelving, display stands, partitions, walls and the like. Examples of these support structures are disclosed by Radek in U.S. Pat. No. 3,101,817; and Berman et al in U.S. Pat. No. 3,174,592. Radek discloses a wall panel support structure comprising a generally upright framework having a plurality of transverse brackets. The brackets have upper and lower channels to accommodate the top and bottom edges of the panels. Berman et al discloses clips mounted on the ends of panels that engage a slotted vertical support standard to hold the panels in assembled relation.

Numerous joint structures and connectors have been used to join adjacent panels together. These structures include dowels, pins, clips, wood strips and metal extrusions. Examples of structural joints for panels are disclosed by Williamson in U.S. Pat. No. 1,888,523; Barker in U.S. Pat. No. 3,323,819; and Logan in U.S. Pat. No. 4,438,578. Williamson discloses a structural joint comprising a generally L-shaped locking strip having bent longitudinal ends. The locking strip fits into linear grooves of adjacent panels to hold adjacent mitered edges of the panels together. Barker discloses a joinder described as a symmetrical L-bar located between bent end flanges of normally disposed panels. A pair of cylindrical wedges cooperate with the joinder to hold the panels in assembled relation with each other. Logan disclose a right angle bracket adapted to fit into channels in adjacent beveled ends of a frame structure. The outer ends of the bracket have bent over portions that fit into cavities in the channels.

SUMMARY OF THE INVENTION

The invention is directed to a grooved panel assembly for the outer surface of a wall, counter fixture or the like for displaying merchandise. Connectors secure adjacent panels together in a manner which provides a sturdy and structural stable connection. The panels are provided with grooved corners. End caps mounted on the panels cover the grooved corners to define slots for accommodating ends of the connectors.

Connectors locked onto the adjacent slotted ends of the panels hold adjacent panels in a tight assembled relationship at either a 180 degree angle, 90 degree angle or 45 degree angle. The connectors are mounted on the panels with a minimum of labor and time and without the use of special tools. Each panel has at least one transverse groove for accommodating hook-shaped heads of brackets that are used to display merchandise.

The preferred form of the panel and connector assembly has a first panel with inner and outer surfaces extended into a first end. The first end has grooves that are open to the top and bottom ends of the first panel. An end cap mounted on the panel has end portions that are located adjacent the grooves to form slots. A second panel has inner and outer surfaces extended into a second end. The second end has grooves that are open to the top and bottom ends of the second panel. An end cap mounted on second the panel has end portions that are located adjacent the grooves in the second end to form slots. The end cap has ribs that are extendable into channels provided in the inner and outer surfaces of the panel to hold the end cap on the panel. Connectors are used to join the first panel to the second panel. Each connector has a transverse wall joined to downwardly extended legs that fit into the slots between the end caps and the ends of the panels to connect the panels together. The connector fixes the angular relationship between the first and second panels at approximately a 180 degree angle. Each panel has at least one transverse groove that is open to the outer surface of the panel for accommodating hangers used to display merchandise and the like.

A first modification of the connector is used to join the first panel to the second panel and fix the angular relationship between the first and second panels at approximately a 90 degree angle. The connector has a transverse wall joined to a pair of downwardly extended legs. The legs are joined to adjacent sides of the wall and extend normal relative the wall and to each other. The legs fit into the slots between the end caps and the ends of the panels to connect the panels together at approximately a 90 degree angle.

A second modification of the connector is used to join the first panel to the second panel and fix the angular relationship between the first and second panels at approximately a 45 degree angle. The connector has a transverse wall joined to a pair of downwardly extended legs. The legs are joined to adjacent sides of the wall and extend normal relative the wall. The legs extend at a 45 degree angle relative to each other. The legs fit into the slots between the end caps and the ends of the panels to connect the panels together at approximately a 45 degree angle.

The panel and connector assembly of the invention is shown and described as a fixture for supporting merchandise. Other uses and advantages of the panels and connectors are not precluded by this disclosure.

DESCRIPTION OF PREFERRED EMBODIMENTS

Figure 1:
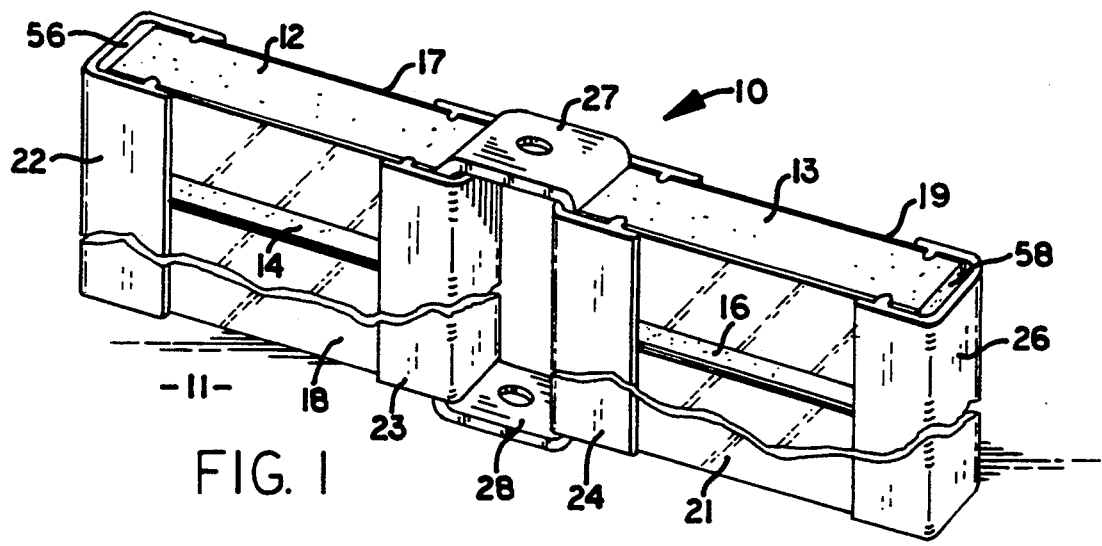
FIG. 1 is a foreshortened perspective view of a fixture having the panels and connectors of the invention showing the panels assembled in about a 180 degree relative relationship.
Figure 2:
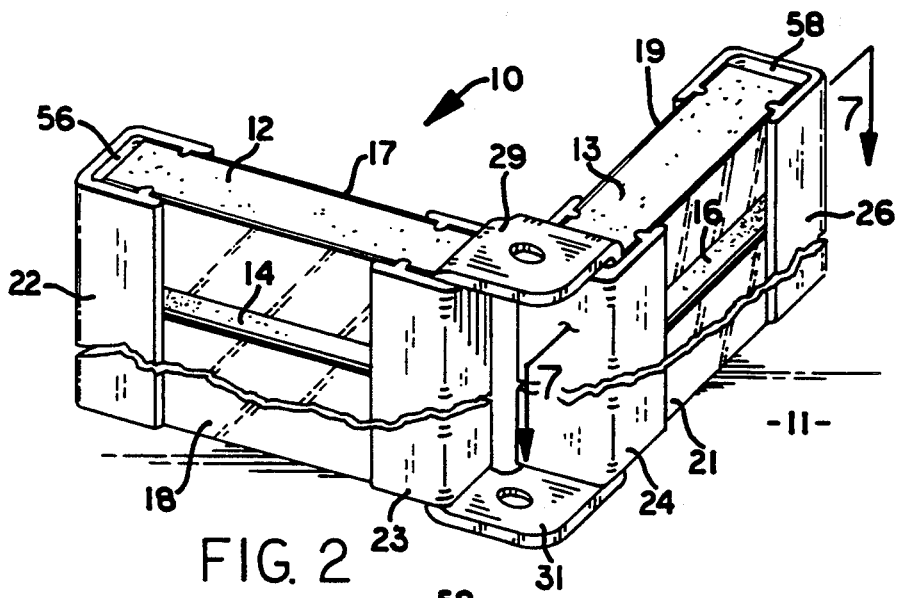
FIG. 2 is a foreshortened perspective view similar to FIG. 1 showing the panels assembled in about a 90 degree relative relationship.
Figure 3:
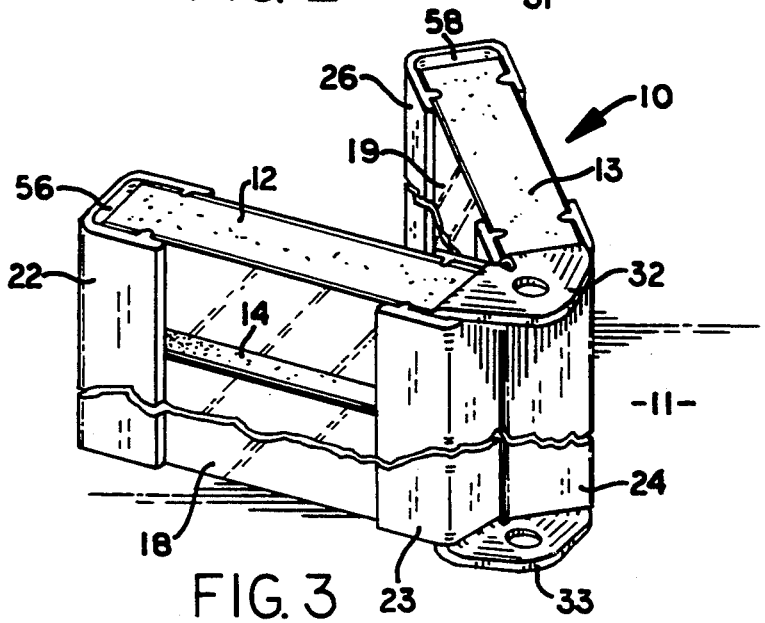
FIG. 3 is a foreshortened perspective view similar to FIG. 1 showing the panels assembled in about a 45 degree relative relationship.

Referring to FIG. 1, there is shown a fixture indicated generally at 10 for displaying and supporting merchandise and the like in a retail or commercial environment. Fixture 10 is supported on floor 11 and has a plurality of horizontally grooved panels 12 and 13. The panels can be used for wall displays, free standing fixtures, as shown in FIGS. 1 to 3, and the like. A variety of brackets, hangers and shelving (not shown) made of wood, metal or plastic are used with panels 12 and 13 to display merchandise. The supports have generally hook-shaped heads that fit into horizontal grooves 14 and 16 in the front surfaces of panels 12 and 13 to attach the supports to the panels.

Referring to FIGS. 1 and 3, panels 12 and 13 have inner continuous surfaces 17 and 19 and outer surfaces 18 and 21. Outer surfaces 18 and 21 are interrupted with horizontal grooves 14 and 16. Grooves 14 and 16 run the length of panels 12 and 13. Grooves 14 and 16 are generally channel-shaped grooves having base portions or tails converging inwardly toward outer surfaces 18 and 21. There also can be a plurality of transversely spaced horizontal grooves on the front surfaces of each panel 12, 13. Grooves 14 and 16 can have other shapes and sizes like a T-shaped groove. Panels 12 and 13 may be made of wood, plastic, and wood laminates and metal. Outer surfaces 18 and 21 of panels 12 and 13 may be painted, unfinished, mirrored, wood veneered and/or laminated with FORMICA plastic. Panels 12 and 13 have a fiberboard core and FORMICA plastic outer faces 18 and 21.

As shown in FIG. 1, a pair of generally vertical channel-shaped end caps 22 and 23 are located on opposite ends of panel 12. End caps 24 and 26 are located on opposite ends of panel 13.

Figure 7:
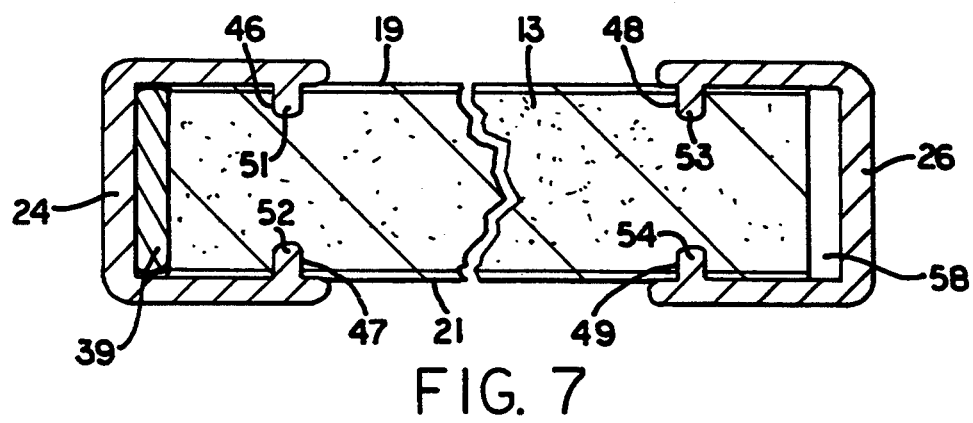
FIG. 7 is a foreshortened enlarged sectional view taken along line 7—7 of FIG. 2.

Referring to FIG. 7, there is shown a cross section of panel 13 shaped to accommodate end caps 24 and 26. Inner surface 19 has a pair of generally vertical grooves 46 and 48 located adjacent the opposite ends of panel 13. Outer surface 21 has vertical grooves 47 and 49 located adjacent the opposite ends of panel 13 in general longitudinal alignment with grooves 46 and 48, respectively. Grooves 46 to 49 extend the length of panel 13. The grooves 46 to 49 are formed with a circular saw or router bit. Other cutting tools and combination of tools can be used to cut grooves 46 to 49. The inner surface 17 and outer surface 18 of panel 12 have vertical grooves made therein in the same manner and locations.

End cap 24 comprises a channel shaped body having generally parallel side walls with a pair of inwardly directed ribs 51 and 52. Ribs 51 and 52 are spaced inwardly from the edges of the side walls of cap 24 and extend the length of cap 24. Ribs 51 and 52 extend into grooves 46 and 47 of panel 13 to hold end cap 24 on the panel. Cap 24 and the grooved end portions of panel 13 define slots 58 for accommodating connectors 27 to 29 and 31 to 33. The end cap 24 also functions to protect the end of panel 13 from damage through use. End cap 24 can be a metal extrusion, plastic, wood and like structural material.

The structure of end cap 26 is identical to the structure of end cap 24. End cap 26 has a channel shaped body having a pair of side walls with inwardly directed ribs 53 and 54. Ribs 53 and 54 extend into grooves 48 and 49 of panel 13 to hold end cap 26 on the panel. The upper and lower end portions of the side faces of panel 13 are grooved inwardly. Slots 58 are defined by end caps 24 and 26 and the grooved end portions of panel 13. The structures of end caps 22 and 23 are identical to the structures of end caps 24 and 26. The upper and lower end portions of the side faces of panel 12 are grooved inwardly substantially similar to panel 13. End caps 22 and 23 mounted on panel 12 extend over the grooved end portions of panel 12 forming slots 56 for accommodating connectors 27 to 29 and 31 to 33.

Figure 4:
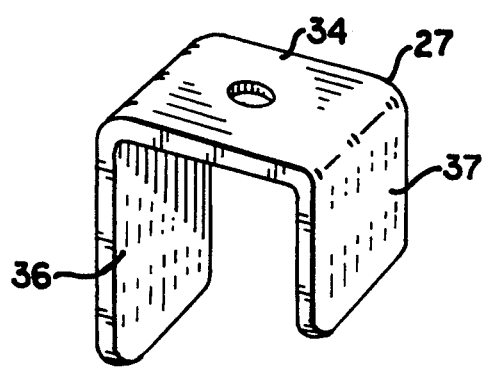
FIG. 4 is an enlarged perspective view of the connector of FIG. 1.

Referring to FIG. 4, there is shown connector 27 comprising a flat rectangular shaped top wall 34 joined to downwardly directed, generally flat legs 36 and 37. Legs 36 and 37 are joined to opposite sides of top wall 34 and project normal to the plane of wall 34. The lower end of leg 36 extends below the lower end of leg 37 whereby connector 27 can be quickly removed from and coupled to panels 12 and 13. Connector 27 can be made of a metal, plastic, wood and like structural material. The structure of connector 28 is identical to the structure of connector 27.

Referring to FIG. 1, connectors 27 and 28 are located in assembled relation with adjacent ends of panels 12 and 13 to retain the panels in fixed angular relation of about 180 degrees. Each of the upper and lower end portions of the side faces of panels 12 and 13 are grooved to form slots 56 and 58 with end caps 22 to 24 and 26. Legs 36 of connectors 27 and 28 extend into slots 56 on opposite upper and lower end portions of panel 12. Legs 37 of connectors 27 and 28 extend into slots 58 on opposite upper and lower end portions of panel 13. The lower ends of legs 36 and 37 are rounded to facilitate insertion thereof into slots 56 and 58. Legs 37 are shorter than legs 36 to facilitate positioning and removal of connectors 27 and 28 within and from slots 56 and 58. Connectors 27 and 28 hold the adjacent ends of panels 12 and 13 in transverse spaced relation relative to each other. Slots 56 and 58 on the outer upper and lower end portions of panels 12 and 13 can accommodate the legs 36, 37 of other connectors 27, 28 to retain additional panels in fixed angular relation of about 180 degrees relative to panels 12 and 13. Slots 56 and 58 can also be used to receive legs 39, 41 and 43, 44 of connectors 29, 31 and 32, 33, respectively, to hold the panels in various fixed angular relations in constructing fixture 10. For example, panels 12 and 13 and connectors 27 to 29 and 31 to 33 can be used to construct a fixture that is triangular shaped or square shaped.

Figure 5:
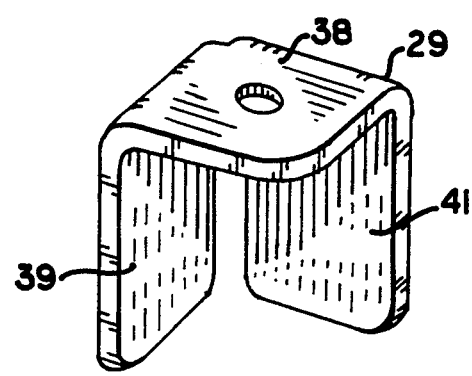
FIG. 5 is an enlarged perspective view of the connector of FIG. 2.

Referring to FIG. 5, connector 29 is shown comprising a flat square shaped top wall 38 connected to a pair of downwardly directed legs 39 and 41. The legs 39 and 41 are generally rectangular shaped members having rounded lower ends. Legs 39 and 41 are joined to adjacent sides of top wall 38 and extend normal to the plane of wall 38. Connector 29 can be made of a metal, plastic or wood structural material and the like. Connectors 29 and 31 have identical structures. Legs 39 and 41 have substantially the same size and shape as legs 36 of connectors 27 and 28.

Referring to FIG. 2, connectors 29 and 31 are located in assembled relation with adjacent ends of panels 12 and 13 to hold the panels in fixed angular relation of about 90 degrees. Slots 56 and 58 formed by the grooved end portions of panels 12 and 13 and end caps 22–24, and 26 accommodate legs 39 and 41. The legs 39 of connectors 29 and 31 extend into slots 56 of panel 12. Legs 41 extend into slots 58 of panel 13. The rounded lower surfaces of legs 39 and 41 facilitate the placement of legs 39 and 41 into slots 56 and 58. Connectors 29 and 31 retain adjacent inner edges of panels 12 and 13 in spaced relation relative to each other. The outer rounded edges of top walls 42 provide a smooth outer surface between the top and bottom edges of panels 12 and 13.

Figure 6:
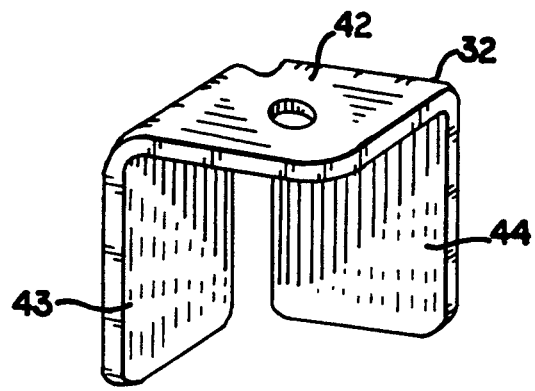
FIG. 6 is an enlarged perspective view of the connector of FIG. 3.

Referring to FIG. 6, connector 32 is shown having a generally flat parallelogram shaped top wall 42 joined to downwardly directed legs 43 and 44. Legs 43 and 44 are connected to adjacent sides of top wall 42 and extend normal to the plane of top wall 42. Legs 43 and 44 have substantially the same rectangular shape having rounded lower ends. The structure of connector 32 is identical to the structure of connector 33. Legs 43 and 44 have the identical size and shape as legs 39 and 41 of connector 29 and leg 36 of connector 27.

Referring to FIG. 3, connectors 32 and 33 are located in assembled relation with adjacent ends of panels 12 and 13 to retain the panels in fixed angular relation of about 45 degrees. Legs 43 extend into slots 56 between end cap 23 and opposite upper and lower end portions of panel 12. Legs 44 of connectors 32 and 33 extend into slots 58 on opposite upper and lower corners of panel 13. The rounded ends of legs 43 and 44 facilitate the placement thereof into slots 56 and 58. Connectors 32 and 33 hold the adjacent inner edges of panels 12 and 13 in engagement with each other. Additional panels can be assembled in fixed angular relation of about 45 degrees relative to panels 12, 13 by coupling the panels with connectors 32 and 33. Angular relationships between the panels of about 180 degrees and 90 degrees is achieved by coupling the panels with connectors 27, 28 and connectors 29, 31, respectively.

While there has been shown and described preferred embodiments of the connectors and panels for fabricating the fixture 10, it is understood that changes in materials, and modifications of the panel, inserts and connector structures can be made by those skilled in the art without departing from the invention. The invention is defined in the following claims.

We claim:

1. A panel and connector assembly for joining panels in an angular relative relationship comprising: a first panel having a top end, a bottom end, a first end face extended between the top end and the bottom end, an outer surface, an inner surface, and first channel means located adjacent the first end face and extended into the outer and inner surfaces, first cap means slidably mounted on the first panel adjacent the first end face, the first cap means having an end wall, and a pair of parallel flanges joined to opposite edges of the end wall, each flange having an inwardly directed rib inserted in the channel means to prevent lateral movement of the cap means relative to the first panel, the end wall of the cap means having opposite upper and lower end portions laterally spaced from the end face of the first panel to define first slot means, the first slot means comprising a pair of first slots located adjacent opposite upper and lower end portions of the end face of the first panel, a second panel having a top end, a bottom end, a second end face extended between the top end and the bottom end thereof, the second panel having an outer surface and an inner surface, and second channel means extended into the outer surface and inner surface, second cap means slidably mounted on the second panel adjacent the second end face, the second cap means having an end wall, and a pair of parallel flanges joined to opposite edges of the end wall, each flange having an inwardly directed rib inserted in the second channel means preventing lateral movement of the second cap means relative to the second panel, the end wall of the second cap means having opposite upper and lower end portions laterally spaced from the second end face to define second slot means, the second slot means comprising a pair of second slots located adjacent opposite upper and lower end portions of the second end face, and a plurality of connector means located in assembled relation with adjacent top and bottom ends of the first panel and second panel joining the first and second panels together in a fixed relationship relative to each other, each connector means comprising a generally U-shaped connector having leg means including a first leg and a second leg, the first leg accommodated by one of the first slots and inserted in engagement with the end face of the first panel and the end wall of the first cap means, the second leg accommodated by one of the second slots adjacent to said first slot and inserted in engagement with the end face of the second panel and the end wall of the second cap means to fix the angular relationship between the first and second panels, each panel having transverse groove means extended into the outer surface of the panel.

2. The assembly of claim 1 wherein: the connector means has a transverse wall, the leg means joined to outer edges of the transverse wall and projected normal to the transverse wall.

3. The assembly of claim 2 wherein: the leg means comprise the first leg joined to the transverse wall and a second leg joined to the transverse wall opposite from the first leg, the first and the second legs extended parallel relative to each other.

4. The assembly of claim 2 wherein: the leg means comprise the first leg joined to the transverse wall and the second leg joined to the transverse wall adjacent to the first leg, the first and second legs extended in an angular relatationship relative to each other.

5. The assembly of claim 1 wherein: the connector means has a transverse wall, the leg means comprising the first and the second legs downwardly directly joined to adjacent sides of the transverse wall.

6. The assembly of claim 5 wherein: the legs extend in an angular relationship relative to each other.

7. The assembly of claim 5 wherein: the legs extend normal relative to each other.

8. The assembly of claim 1 wherein: the transverse groove means comprises at least one transverse groove extending the length of the panel for accommodating hanger means.

9. The assembly of claim 8 wherein: the transverse groove is a generally channel shaped groove.

10. A panel and connector assembly for joining adjacent panels in an angular relative relationship comprising: a first panel having an outer surface, an inner surface, an end with a face extended normal to the inner surface and the outer surface thereof, and a pair of generally vertical channels extended into the inner and outer surfaces, first cap means mounted on the end of the first panel, the first cap means having an end wall joined to a pair of parallel generally linear flanges, each flange having an inwardly directed rib inserted in one of the channels to prevent lateral movement of the cap means relative to the first panel, the end wall of the first cap means laterally spaced from the face of the first panel, the end wall, flanges and face providing first slot means, the first slot means comprising a pair of first slots located adjacent opposite upper and lower end portions of the face of the first panel, a second panel having an outer surface, an inner surface, an end with a second face extended normal to the inner surface and the outer surface thereof, and a pair of generally vertical channels extended into the inner and outer surfaces of the second panel, second cap means mounted on the end of the second panel, the second cap means having an end wall joined to a pair of parallel generally linear flanges, each flange having an inwardly directed rib inserted in one of the channels to prevent lateral movement of the second cap means relative to the second panel, the end wall of the second cap means laterally spaced from the face of the second panel, the end wall, flanges and face of the second panel providing second slot means, the second slot means comprising a pair of second slots located adjacent opposite upper and lower end portions of the face of the second panel, each panel having at least one transverse groove extended into the outer surface thereof for accommodating hanger means, and a plurality of connector means joining the upper ends and lower ends of the first and second panels together in a fixed angular relation relative to each other, each connector means comprising a generally U-shaped member having a transverse wall extended between the first and second end faces, and leg means including a first leg and a second leg joined to the transverse wall, the first leg accommodated by one of the first slots and located in engagement with the first end face and the end wall of the first cap means, the second leg accommodated by one of the second slots adjacent to said first slot and located in engagement with the second end face and the end wall of the second cap means to retain the first and second panels in the angular relation relative to each other.

11. The assembly of claim 10 wherein: each cap means comprises an elongated channel shaped member, the ribs being spaced inwardly from inner edges of the member.

12. The assembly of claim 10 wherein: the leg means are joined to the outer edges of the transverse wall and project normal to the transverse wall.

13. The assembly of claim 10 wherein: the leg means comprise the first leg joined to the transverse wall and the second leg joined to the transverse wall opposite from the first leg, the first and second legs extended parallel relative to each other.

14. The assembly of claim 10 wherein: the leg means comprise the first leg joined to the transverse wall an the second leg joined to the transverse wall adjacent to the first leg, the first and second legs extended in an angular relationship relative to each other.

15. The assembly of claim 14 wherein: the legs extend normal relative to each other.

16. A panel and connector assembly comprising: a first panel having an outer surface and an inner surface, at least one transverse groove extended into the outer surface for accommodating hanger means, a first side end extended between the outer surface and the inner surface thereof, first cap means mounted on the first side end, the first panel having first groove means adjacent the first side end, the first cap means having first rib means slidably inserted in the first groove means to prevent lateral movement of the first cap means relative to the first side end, the first panel having a top end and a bottom end, first slot means located adjacent the top end between the first cap means and the first side end, second slot means located adjacent the bottom end between the first cap means and first side end in general longitudinal alignment with the first slot means, a second panel having an outer surface and an inner surface, at least one transverse groove extended into the outer surface of the second panel for accommodating hanger means, a second side end extended between the outer surface and the inner surface thereof, second cap means mounted on the second side end, the second panel having second groove means adjacent the second side end, the second cap means having second rib means slidably inserted in the second groove means preventing lateral movement of the second cap means relative to the second side end, the second panel having a top end and a bottom end, third slot means located adjacent the top end of the second panel between the second cap means and the second side end, fourth slot means located adjacent the bottom end of the second panel between the second cap means and second side end in general longitudinal alignment with the third slot means, and connector means joining the top ends and bottom ends of the first and second panels together in a fixed relationship relative to each other, the connector means comprising a first connector member joining the top ends of the first and second panels together, and a second connector member joining the bottom ends of the first and second panels together, the first connector member having a transverse wall extended between the first and second side ends, first leg means joined to the wall and extendable into the first slot means in engagement with the first side end and the first cap means, and second leg means joined to the wall and extendable into the third slot means in engagement with the second side end and the second cap means, the second connector member having a second transverse wall extended between the first and second side ends, third leg means joined to the second wall and extendable into the second slot means in engagement with the first side end and the first cap means, and fourth leg means joined to the second wall extendable into the fourth slot means in engagement with the second side end and the second cap means to fix the angular relationship between the first and second panels.

17. The assembly of claim 16 wherein: the first cap means has a first inner surface laterally spaced from the first side end forming the first and third slot means, the second cap means having a second inner surface laterally spaced from the second side end forming the second and fourth slot means.

18. The assembly of claim 17 wherein: the first slot means is open to the top end of the first panel, the second slot means being open to the bottom end of the first panel, the third slot means being open to the top end of the second panel, and the fourth slot means being open to the bottom end of the second panel.

* * * * *